United States Patent [19]

Sobrero

[11] Patent Number: 5,396,980
[45] Date of Patent: Mar. 14, 1995

[54] PROCESS AND A DEVICE FOR CONVEYING ARTICLES, PARTICULARLY FOR AUTOMATIC PACKAGING PLANTS

[75] Inventor: Giovanni Sobrero, Cerreto Langhe, Italy

[73] Assignee: Soremartec S.A., Schoppach-Arlon, Belgium

[21] Appl. No.: 205,501

[22] Filed: Mar. 4, 1994

[30] Foreign Application Priority Data

Mar. 12, 1993 [CH] Switzerland ............ 0750/93

[51] Int. Cl.6 ............................................ B65G 47/26
[52] U.S. Cl. .................................. 198/433; 198/370; 198/372; 198/458
[58] Field of Search ............... 198/370, 372, 433, 458

[56] References Cited

U.S. PATENT DOCUMENTS

| | | | |
|---|---|---|---|
| 3,297,129 | 1/1967 | Lesch | 198/433 |
| 3,429,416 | 2/1969 | Provost et al. | 198/433 |
| 3,463,291 | 8/1969 | Cummings | 198/433 |
| 3,669,240 | 6/1972 | Ross | 198/458 |
| 4,083,275 | 4/1978 | Lingl | 198/458 |
| 4,192,416 | 3/1980 | Thonissen | 198/433 |
| 5,251,740 | 10/1993 | Spatafora et al. | 198/458 |

Primary Examiner—Joseph E. Valenza
Attorney, Agent, or Firm—Rothwell, Figg, Ernst & Kurz

[57] ABSTRACT

A process and device for conveying articles, such as boxes of confectionery products. The articles, which initially advance on a plurality of parallel paths, are firstly ordered into rows such that they slide on a surface of a plate under the action of motor-driven entrainment strips or blades. When they pass onto a conveyor which acts transversely relative to the general direction of advance of the articles on the plate, the rows are made compact and the articles are urged against a side restraint plate. The articles can then be withdrawn from the compact rows in a predetermined number when the rows themselves pass in correspondence with further motor-driven conveyors which act transverse the general entrainment line of the articles. The withdrawal operation can be repeated several times, the rows having been made compact in the interim urging the articles against the side plate again.

12 Claims, 3 Drawing Sheets

PROCESS AND A DEVICE FOR CONVEYING ARTICLES, PARTICULARLY FOR AUTOMATIC PACKAGING PLANTS

BACKGROUND OF THE INVENTION

1. Field of the Invention

The present invention relates to a process for conveying articles supplied in respective flow lines adjacent to one another.

The invention has been developed with particular attention to the possible use in the field of plants for automatically packaging products, such as food products, for example confectionery products.

2. Description of the Relevant Art

Within the context of this application, the problem of sorting the flow of articles coming from respective source stations to subsequent processing stations located downstream in the direction of flow of the articles occurs relatively frequently. For example, the source stations can be packaging machines in which products such as snacks, biscuits, etc., packaged in flexible wrappers (flow-packs), are inserted in groups in respective boxes. The further processing stations can, for example, be wrapping machines in which each box is in turn inserted in a further wrapping in the form of a flexible wrapper of the flow-pack type.

Within the context of this application, a number of problems arise of which account must be taken.

Firstly, the source stations (for example, the boxing machines) usually supply a conveying line with parallel rows. Each source machine supplies a respective row with a flow of articles which, although it is substantially constant, is not completely continuous, owing to various reasons: for example, temporary stoppages of the source station because of a lack of packaging material, discharge of defective articles upstream or downstream of the source station, etc.

Secondly, the number of source stations and thus of the parallel rows of the flow of articles generated thereby is generally different from the number of processing stations provided downstream. For example, it is possible to envisage ten source stations (for example, ten boxing machines) downstream of which there are only two wrapping machines, or four wrapping machines of which two are intended to operate continuously whilst the other two are used to take account of possible interruptions in the operation of the other wrapping machines or of incidents occurring in the flow of articles to be packaged.

It is generally known to overcome the above problems by resorting to a so-called accumulation (or "store") function, that is, by providing for a certain amassing of articles (the so-called accumulation or store) between the outlets of the source stations and the inlets of the stations situated downstream, from which the articles themselves can be taken up in an ordered flow so as to be sent in a regular rhythm to the handling stations located downstream.

Although this situation is entirely satisfactory in theory, it conflicts with certain practical difficulties.

Firstly, forming an accumulation or store of articles generally requires the stoppage or at least a great deceleration of the movement of the advancing articles themselves. In modern packaging plants with high processing rates of the articles (some hundreds of units per minute), the speed of the advancing articles tends to be fairly high: any stoppage or great deceleration, above all when it occurs as a result of impact on the articles located downstream, may be particularly damaging, especially with fragile articles, with soft and yielding articles and/or with articles which, particularly when packaged, display marked resilience to knocks: in practice, one or more articles may well be bounced out of their box because of the effect of knocking against a stop barrier. Again, particularly when products which are not yet wrapped are used, the knocks can give rise to fragments or small pieces which can soil the packaging plant.

Secondly, the greater the linear speed of movement of the articles, the greater the space occupied by the accumulation or storage areas.

SUMMARY OF THE INVENTION

The object of the present invention is to provide a process and device which can overcome the above problems, on the one hand, avoiding great stresses on the articles processed and, on the other hand, minimising the need for recourse to an accumulation zone, thus reducing the space occupied by the packaging plant.

BRIEF DESCRIPTION OF THE DRAWINGS

The invention will now be described, purely by way of non-limiting example, with reference to the appended drawings, in which:

FIG. 1 shows the planimetric development (so-called layout) of a plant for automatically packaging articles such as, for example, food products, in particular confectionery products as a general plan view.

In order to fix the concept, it can be imagined that the articles in question consist of products such as snacks, bars of chocolate, biscuits or stacks of biscuits in respective packages in the form of flexible wrappers (for example, of the type currently known as "flow-pack") and arranged in groups in respective containers such as parallelepipedal cardboard boxes. These boxes are filled in respective "source stations" M provided, in the embodiment illustrated, in groups of ten.

The structure of the source stations M (usually consisting, in cascade, of a first wrapping machine of the flow-pack type followed by a boxing machine proper) is widely known in the art and, as such, need not be described in detail here, since it is also irrelevant with respect to an understanding of the invention.

For this purpose, it is sufficient to note that the source stations M supply the respective packaged articles onto an output line L typically consisting of an assembly of conveyors (for example, chain or belt conveyors) which define a respective flow line of articles for each station M.

In practice, the output end of the line L (shown in particular on the lefthand side of FIG. 2) can be viewed as a conveyor such as, for example, a motor-driven belt conveyor on which the articles A are in their respective advancing lines indicated L1 to L10.

As regards the inflow conditions of the articles A at the downstream end of the line L, it can be noted that:

as stated above, the articles A arrive on paths which are parallel to one another, each path corresponding to the flow of articles generated by a respective source station M;

each flow, although it is uniform overall, is not uniform in the absolute sense, in the sense that breaks in continuity may be present because of various factors, such as the temporary stoppage of the respective source station M (for changing paper, discharging defective articles, etc.); and the articles A which arrive on the various lines L1, L10 are not generally synchronised with one another in the sense that the position of the articles in the various flows is not such that these articles are generally aligned relative to each other transverse the line L.

The operation of the device according to the invention, generally indicated 1, is usually such that it allows the articles A to be fed in a flow, which is as regular as possible, therefore timed exactly and without interruptions in continuity, towards respective handling stations situated downstream, generally indicated G.

For example, the stations G can consist of wrapping machines for wrapping each article A (and thus each box) in a respective flexible wrapper (flow-pack).

Figure 1:
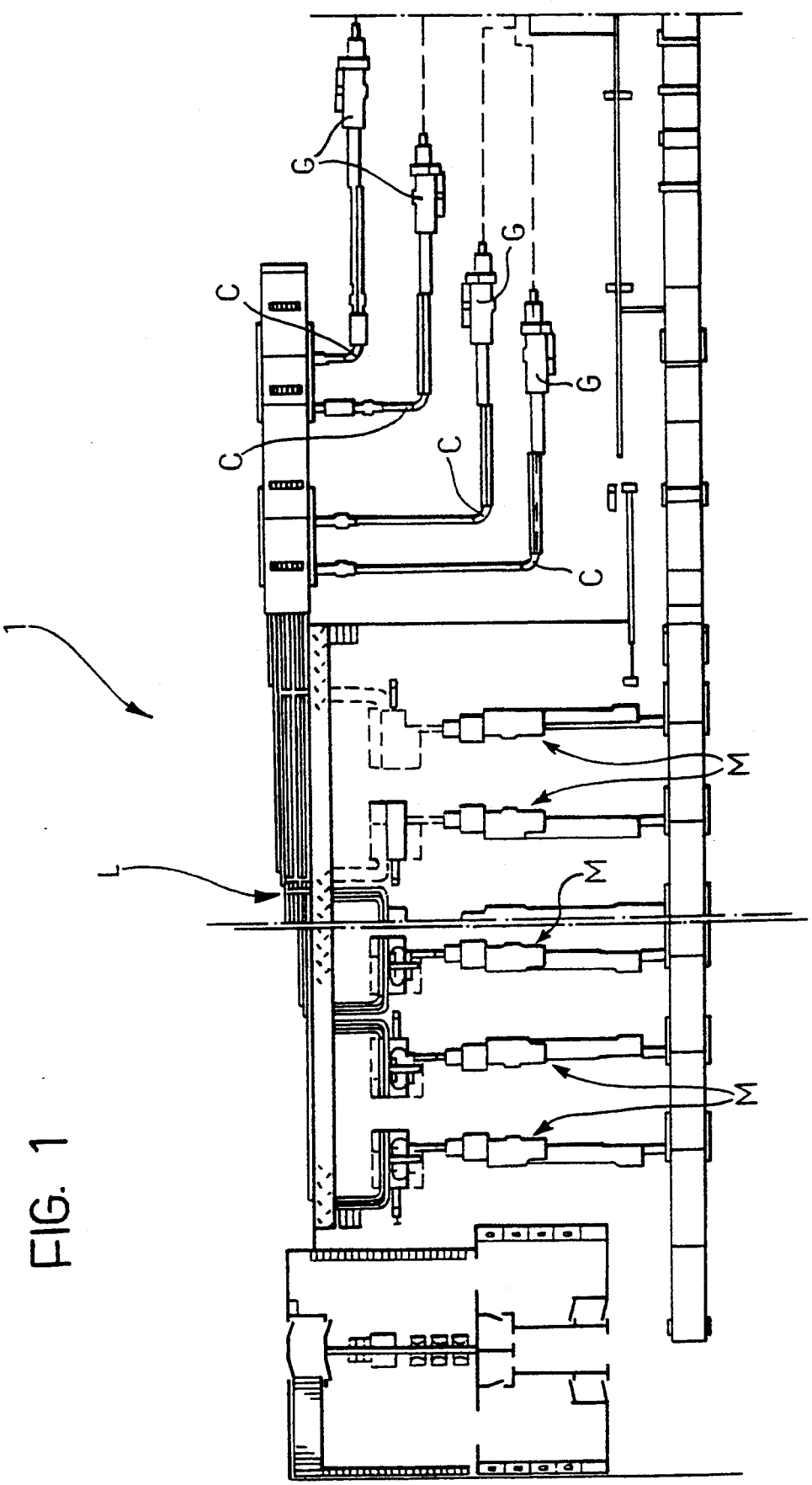
FIG. 1 shows the development in plan view of an automatic packaging plant comprising a device according to the invention.

In the embodiment illustrated, there are four downstream handling stations G of which the first two, those situated further to the left in FIG. 1, can be used as master stations, intended to operate continuously, whilst the other two, those illustrated further to the right, can function as auxiliary packing stations, intended to function intermittently both to replace a principal station which is temporarily stopped and to compensate for accumulations of articles, because of particular interference with the regular operation of the plant.

In each case, both the choice of the number of stations G relative to the number of stations M and the adoption of an operating arrangement with master stations and auxiliary stations and the relative positioning of these stations should be considered as factors which generally have no influence on the structure of the device 1, in the sense that the device 1 can be arranged such that it serves any number of upstream stations M and downstream stations G, independently of the operating strategy adopted for the latter and as regards the spatial arrangement thereof.

In the remainder of the present description, specific reference will be made to the method by which the device 1 regulates the supply of the articles A to one of the stations G located downstream. It should be appreciated that it is intended that identical methods are adopted for the supply to the other stations G.

In the embodiment illustrated, the device 1 is arranged such that it receives the articles A which arrive at the output end of the line L arranged end-to-end, that is, in such a way that the articles A, on the device 1, tend initially to follow an advancing path aligned with the advancing paths of the lines L1, . . . , L10. The same device 1 should then transfer the articles A to the lines G located downstream by a movement (initially of adjustment and then of net translation) which develops in a direction generally transverse the advancing directions on the line L and entry into the device 1.

The device 1 substantially consists of a plate 2 usually consisting of a metal plate mounted in a fixed position on a casing and extending, in normal operating conditions, in a generally horizontal direction.

A conveyor device consisting, in a preferred embodiment, of two lateral motor-driven members 3 located along the longer sides of the plate 2, acts above the plate 2. In particular, each of the members 3 consists of a chain (or a similar flexible element) which is wound—in known manner—about respective end rollers (not shown in the drawing, but located at the upstream and downstream ends of the plate 2 respectively) with an active pass 3a extending horizontally above the plate 2 and a return pass located above or below the plate 2.

Rectilinear entrainment elements 5 consisting, for example, of sheets or strips 5 extend between the two chains 3 in a direction generally transverse the arrival direction of the articles A on the device 1. The strips 5 are supported at their ends by the active passes 3a of the chains 3 and generally extend downwards (towards the plate 2 but usually without touching it) in a position of interference with the articles A which are on the plate itself.

Figure 2:
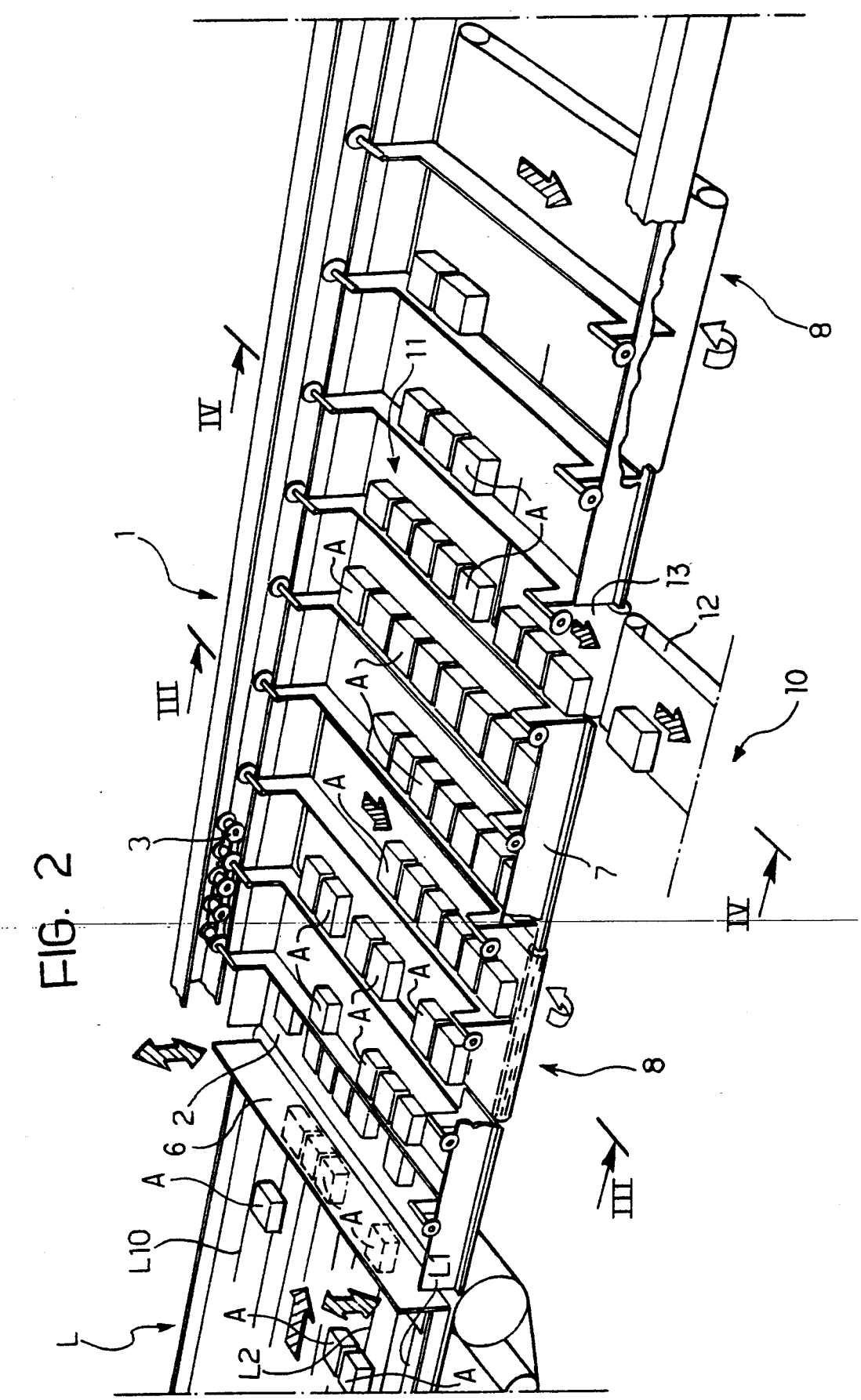
FIG. 2 shows the structure of a device according to the invention in a schematic view in perspective.

The arrangement described is such that, when the chains 3 move (as a result of the end rollers being rotated—also in known manner—by motors not illustrated), the upper passes 3a and the strips 5 suspended therebetween perform a net translational movement along and above the upper face of the plate 2: with reference to the position illustrated in FIGS. 1 and 2, this movement is from left to right.

By virtue of the reduced distance between the lower edge of the strips 5 and the plate 2, the articles A situated on the plate itself are subjected to a thrust movement (brushing) causing the articles A, which arrive on the plate 2 scattered (that is, in a flow which is quite irregular relative to the advancing direction on the line L), to give rise to an ordered sequence of rows of articles A which advance on the plate 2. The term "row" is intended to define a line of articles A aligned in a direction transverse the direction of advance on the line L with the rear side of the articles bearing on a respective motor-driven strip 5 which advances the articles A onto the plate 2 (continuously or, better, in steps).

Since they are only just formed when the articles A enter the device 1, the rows are generally incomplete: see in this respect the end of the device 1 which is further to the left in FIG. 2. As explained above, although it is substantially continuous, the advance of the articles A along the paths L1, . . . , L10, is not totally free of spaces or breaks in continuity. The presence of a space or a break in continuity on any of the paths L1, . . . , L10 is manifested by a corresponding space in the row of articles A which is to be formed on the device 2.

It will be appreciated that the solution for the formation of the rows described above is given purely by way of example. In particular, instead of using strips 5 held at the ends by the chains 3a, located on opposite sides of the plate 2, it is possible to envisage a different type of entrainment structure. For example, it is possible to envisage using strips 5 which, instead of being supported at both ends, are supported by a drive structure located on one side of the plate 2 and are thus mounted such that they project relative to the plate 2. Or, still for causing the sliding movement of the articles A on the plate 2 by acting from above, it is possible to envisage using structures with motor-driven strips or equivalent elements, (for example, blades, etc.). In any case, the choice of one or other solution should not be used to limit the implementation of the invention.

In each case, the articles A are preferably transferred on the device 1 (and, in particular, on the plate 2) when they have been subjected to a first action in which they are at least partially arranged in rows.

For this purpose, it is possible no dispose at the outlet end of the line L an ordering element, such as a further strip or barrier 6 with associated drive means (not illustrated but of a widely known type) which support the barrier 6 such that it is periodically lowered from above towards the outlet end of the line L such that a given number of articles arriving on the line L accumulate against it, arranging these articles in order—at least approximately—in a line intended to form a respective row of articles being transferred on the device 1.

As an alternative to a barrier, a solution which may not be considered the best as regards the impact of the articles A, it is possible to envisage attaining the same function with a different element or surface which can decelerate the movement of the articles (A), for example, with a further motor-driven belt, interposed between the line L and the inlet end of the device 1: the belt being advanced in steps which gives rise to the formation of a line of articles intended to constitute a row whenever the movement of the belt is stopped.

In each case, when a row of articles A has formed on the plate 2, the device 1 intervenes in order to render the row compact, that is, it moves the articles A in each row towards one another which leads to the elimination of any existing spaces (for example, if there is a lack of articles in the flow on one or more of the supply paths L1, ..., L10) between adjacent articles.

Figure 3:
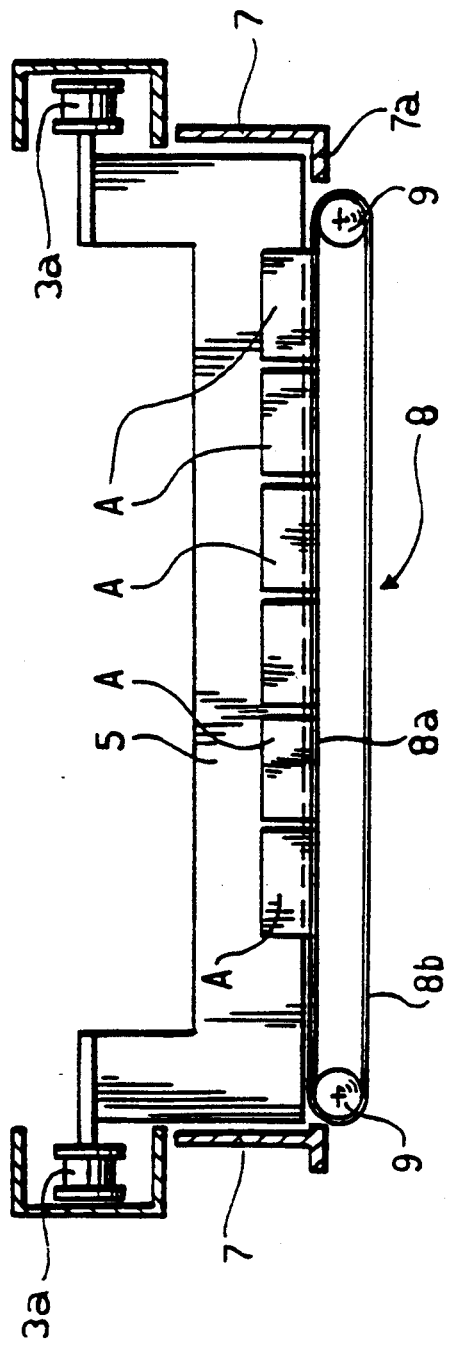
FIG. 3 is a section along the line III—III of FIG. 2.

For this purpose (see the view in FIG. 3 in particular), on one of the sides of the plate 2 (and, to be precise, on the side from which the articles will subsequently be supplied to the handling stations G) a stopping structure 7 is provided consisting, for example, of a side made of sheet metal which extends along the corresponding longitudinal edge of the plate 2 in a position such that it interferes with the plate 2 itself, preferably with a lower edge part 7a, turned under the plane of the plate 2, and extending at approximately the same height as the plate 2 itself.

In correspondence with the side plate 7, in the plane of the plate 2, a transverse movable element emerges, through a respective window, which, in the example illustrated, consists of a further belt conveyor 8 having an upper pass 8a which acts horizontally and is aligned exactly with the plane of the plate 2 and a lower pass 8b situated below the plane of the plate 2 itself. The belt 8 is wound (according to a widely known solution) on end pulleys or rollers 9 with associated drive elements (of a widely known type). When they are actuated, the rollers or pulleys 9 move the belt 8 itself such that the upper pass 8a follows a net translation path in the direction transverse the direction of advance of the rows of articles A controlled by the strips 5.

The net effect of the advance of the upper pass 8a (from top to bottom with reference to FIG. 2 and from left to right with reference to FIG. 3) is to carry the articles A, combined in a row but spaced apart from each other (even irregularly if there are spaces because of shortages in the supply on the respective conveying line L1, ..., L10), to move gradually against the side plate 7 so as to form a compact row, that is to say, an array in which all the articles A are adjacent one another, without spaces, forming a line which bears at one end against the side plate 7: it will be appreciated that the above occurs whilst the articles A continue their longitudinal sliding movement on the plate 2 under the action of the strips 5.

As stated above, this advance movement (and hence the actuation movement of the strips 5, controlled by the chains 3 in the example illustrated) can occur continuously or in steps, according to the solution preferred at the time.

The gradual compacting movement of the row by virtue of the resistance from the side plate 7 can be performed very gradually and smoothly, that is, by the effect of a translation movement of the upper pass 8a of the motor-driven belt 8 at reduced speed, if there is an initial acceleration ramp and a corresponding final deceleration ramp which avoids great stresses which could damage the articles A being applied thereto.

By virtue of the gradual advance along the plate 2 controlled by the strips 5, the articles A, now arranged in compact rows, travel beyond the position in which the belt 8 acts and pass to one (or more) withdrawal station (s) arranged in cascade.

Figure 4:
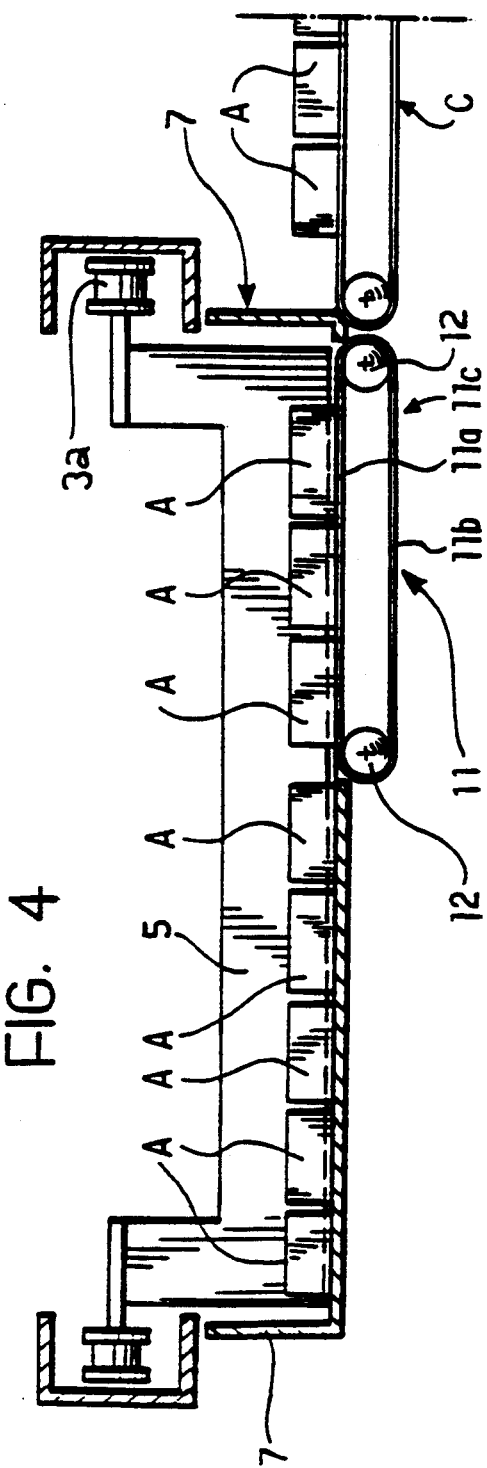
FIG. 4 is a section along the line IV—IV of FIG. 2.

FIG. 2 (and, similarly, FIG. 4) shows the structure of one of these withdrawal stations, that is to say, in the example illustrated, the station which is in the most upstream position relative to the device 1: this is the withdrawal station intended to Supply the processing station G located further upstream, in the direction of flow of the articles A within the scope of the plant according to FIG. 1.

The withdrawal station, generally indicated 10, has a structure which, to a certain degree, is similar to the structure adopted for performing the lateral compacting action of the rows by the belt 8.

In this case too, in fact, the sliding surface defined by the plate 2 has a rectangular window in which the further motor-driven belt conveyor 11 extends horizontally, this belt conveyor having an upper pass 11a, aligned exactly with the plane of the plate 2, and a lower, return pass 11b located below the plate 2 itself, with end rollers 12 which control the advance movement of the upper pass 11a of the conveyor in the direction which discharges the articles A from the device 1.

In order to achieve this result, the side plate 7 has an aperture (indicated 13 in FIG. 1) in correspondence with the withdrawal station 10.

A further difference with respect to the assembly arrangement of the conveyor-compacting device 8 is provided by the fact that the withdrawal conveyor 11 does not extend over the entire transverse dimension of the plate 2 but, on the contrary, only over a portion or recess corresponding to the width (measured in the direction transverse the direction of advance imparted by the strips 5) of a given number of articles A (for example, with reference to the example illustrated, three articles A).

This, therefore, means that only the first three articles (or, in general, the first n articles) which are sliding close to the side plate 7 are affected by the tapping action actuated by the upper pass 11a of the conveyor 11.

In particular, the movement of the conveyor 11 is such that three (or, in general, n) articles A are withdrawn by the device 1 so as to be sent on an outlet conveyor C constituting the feed conveyor of a respective actuating station G.

Preferably, the conveyor C is also formed by a motor-driven-type endless belt having a loading or upstream end situated in the immediate vicinity of the outlet end, indicated 11c, of the conveyor 11.

The arrangement described thus allows each of the withdrawal stations 10 to tap a predetermined given number (3, in the example illustrated here) of articles A from the rows A advancing on the plate 2, transversely to the direction of advance of the rows.

The withdrawal action thus performed determines the removal, so to speak, of an end or head part within the scope of the row of articles A.

In order to enable other withdrawal actions to be performed, once the withdrawal station 10 has been passed, the rows of articles A advance towards a further lateral translation device consisting of a belt 8 arranged in a manner substantially similar to that described above and the operation of which is to bring the remainder of the line back into contact with the side plate 7 so as to return a given number of articles A into the vicinity of the side plate 7 itself.

When the row has been placed against the side plate 7, a further group of articles (for example, three other articles) can be taken up in the lateral direction relative to the device 1: the whole being in accordance with criteria which are entirely identical to those described above in relation to the withdrawal station 10.

The solution described has the advantage of being able to minimise (possibly reducing it to one unit) the number of articles A which are tapped from time to time from the device 1 in order to advance towards a respective processing station G. This enables a precise regulation or regularisation of the flow of articles towards the processing stations G to be achieved, which, in turn, enables the presence of accumulation zones (storage) in the feed lines of these machines to be reduced and virtually eliminated.

What has been stated above applies also as regards the possibility of regularising and rendering uniform the withdrawal action of the articles A from the device 1, which enables the feed lines of the stations G to be constantly and regularly supplied, in almost certain conditions, minimising the need for recourse to the operation of the stations G which are kept on standby (auxiliary stations G).

What is claimed is:

1. A process for conveying articles supplied in respective flow lines adjacent one another, wherein said process comprises the operations of:

forming respective rows of articles from the articles advancing along the flow lines, each row consisting of articles aligned transversely relative to the flow lines;

moving the articles in each row towards one another so as to form compact rows of articles in contact with each other; and withdrawing a predetermined number of articles from each compact row; this withdrawal being effected by moving the predetermined number of articles transversely relative to the direction of advance of the rows.

2. A process according to claim 1, wherein said rows of articles are formed by feeding the articles themselves onto a sliding surface and by acting upon the articles with movable alignment means which cause the articles to slide on the sliding surface and bring them into alignment in a row consisting of articles in contact with said alignment means.

3. A process according to claim 1, wherein the rows are formed by at least temporarily decelerating the movement of the articles.

4. A process according to claim 1, wherein the moving together of the articles in each row is effected by an abutment surface which is substantially adjacent and aligned with the direction of advance of the rows and thus favours a sliding movement of the articles towards the abutment surface.

5. A process according to claim 4, wherein the predetermined number of articles are withdrawn in correspondence with an aperture in the abutment surface for the passage of said articles.

6. A process according to claim 1, wherein the articles are withdrawn in a plurality of positions of the general advancing movement of the rows, and the process comprises a further operation of accumulating the rows between the successive withdrawal positions.

7. A device for conveying articles supplied in respective adjacent flow lines, wherein said device comprises:

alignment means for forming respective rows of articles from the articles advancing along the flow lines, each row consisting of articles aligned in a transverse direction relative to the flow lines;

conveyor means for moving the articles in each row towards one another so as to form compact rows of articles in contact with each another; and further conveyor means for withdrawing a predetermined number of articles from each compact row, the further conveyor means being arranged so as to move the predetermined number of articles transversely relative to the direction of advance of the rows.

8. A device according to claim 7, wherein it comprises a sliding surface onto which the articles are fed from the flow lines, and motor-driven alignment means which produce the sliding movement of the articles on the sliding surface so as to bring the articles into alignment in a row consisting of articles in contact with the alignment means.

9. A device according to claim 7, wherein it comprises means for decelerating the movement of the articles, at least temporarily, in order to form the rows.

10. A device according to claim 7, wherein it comprises an abutment surface which is substantially adjacent and aligned with the direction of advance of the rows and conveyor means for producing a sliding movement of the articles towards said abutment surface.

11. A device according to claim 10, wherein said abutment surface has an aperture for the passage of the articles withdrawn in correspondence with said further conveyor means.

12. A device according to claim 7, wherein it comprises a plurality of further conveyor means, respective conveyor means being interposed between these further conveyor means to accumulate the rows between two successive withdrawals of articles.

* * * * *

UNITED STATES PATENT AND TRADEMARK OFFICE
CERTIFICATE OF CORRECTION

PATENT NO. : 5,396,980
DATED : March 14, 1995
INVENTOR(S) : Giovanni Sobrero

It is certified that error appears in the above-indentified patent and that said Letters Patent is hereby corrected as shown below:

Column 8, line 29 claim 7, "another" should read --other--.

Signed and Sealed this

Twentieth Day of June, 1995

Attest:

BRUCE LEHMAN

Attesting Officer

Commissioner of Patents and Trademarks